United States Patent [19]

Ames et al.

[11] Patent Number: 5,744,555

[45] Date of Patent: Apr. 28, 1998

[54] PROCESS FOR THE SYNTHESIS OF ELASTOMERIC POLYPROPYLENE

[75] Inventors: William A. Ames; Robert E. Holliday, both of Longview; Timothy J. McKeon, White Oak; Luis A. Pagan; James H. Scott, both of Longview; Horst K. Seeger; Gregory T. Slemons, both of Longview; Max Statman; Jeffrey J. Vanderbilt, both of Longview, all of Tex.

[73] Assignee: Eastman Chemical Company, Kingsport, Tenn.

[21] Appl. No.: 344,924

[22] Filed: Nov. 25, 1994

[51] Int. Cl.$^6$ ....................................... C08F 2/06
[52] U.S. Cl. ................. 526/67; 526/68; 526/69; 526/70; 526/88; 526/348.2; 526/348.5; 526/351; 526/904; 422/135; 422/136
[58] Field of Search ................. 526/67, 68, 69, 526/70, 88, 348.2, 348.5, 351, 904; 422/135, 136

[56] References Cited

U.S. PATENT DOCUMENTS 4,228,263  10/1980  Howard, Jr. et al. ............... 526/154
5,205,175  4/1993  Garza et al. ..................... 128/660.07 X
5,207,225  5/1993  Oaks et al. ...................... 128/660.1
5,318,027  6/1994  Fukui ............................. 128/660.01
5,328,666  7/1994  Amano et al. ..................... 422/138

FOREIGN PATENT DOCUMENTS 0 409 492 A1  1/1991  European Pat. Off.

*Primary Examiner*—David W. Wu
*Attorney, Agent, or Firm*—Mark A. Montgomery; Harry J. Gwinnell

[57] ABSTRACT

A process for the production of elastomeric polypropylene is disclosed. The process entails contacting the propylene monomer neat or in an unreactive hydrocarbon solvent, with a catalyst in a recirculated, stirred reactor at a temperature of about 60° to 80° C. thereby producing elastomeric polypropylene. The reactor contents are in the slurry/solution phase and are essentially free of catalyst poisons. The reactor is capable of recirculating contents that are very viscous such that the reactor contents are well mixed while a portion of the contents of the reactor containing propylene, any solvent, and elastomeric polypropylene are continually removed by the use of a high viscosity pump to recover the elastomeric polypropylene.

20 Claims, 1 Drawing Sheet

PROCESS FOR THE SYNTHESIS OF ELASTOMERIC POLYPROPYLENE

FIELD OF THE INVENTION

This invention relates to the synthesis of elastomeric polypropylene. More particularly the present invention relates to the synthesis of elastomeric polypropylene in a continuous process. The present invention also relates to the production of elastomeric polypropylene in a slurry/solution process containing high amounts of solids.

BACKGROUND OF INVENTION

The synthesis of elastomeric polypropylene is known. The production of elastomeric polypropylene (ELPP) with a tetraneophyl zirconium (TNZ)/fumed alumina ($Al_2O_3$) catalyst is disclosed in U.S. Pat. No. 4,335,225. ELPP's unique combination of relatively high melting point, low density, low crystallinity (low flexural modulus, hardness and tensile strength) high elongation and elastomeric nature make it ideally suited for a variety of uses. This includes many applications presently using flexible polyvinyl chloride (PVC), ethylene-vinyl acetate copolymers, low density polyethylene as well as other pure or compounded products. However, ELPP is not currently available commercially due to the high cost of production.

The development of a market for ELPP in spite of its interesting balance of physical properties depends to a high degree on economics, because it has to be price competitive with existing polymers it would replace. This price competitiveness for ELPP does not currently exist. Therefore, an economical process for the production of ELPP would be very desirable.

The current attempts to produce ELPP with the catalyst delivery system consisting of circulating the catalyst mineral spirits slurry through a catalyst tank and pumping the catalyst into the reactor were discovered not to work because the pumps could not withstand the abrasive nature of the $Al_2O_3$ (Carborundum). Attempts using a loop reactor and employing mineral spirits as reaction medium were also discovered not to work, because the polymer was coating out on the walls and finally was plugging up the reactor.

Gas phase, solution phase and slurry phase continuous processes have been disclosed and commercialized for the production of crystalline (Isotactic) and amorphous (Atactic) polypropylene. Neither of which exhibits elastomeric properties. The reactor medium of the known processes are a solid polymer suspension in gas (gas phase), a polymer solution (solution phase) and a polymer slurry in low boiling hydrocarbon solvents (slurry phase). None of the prior art processes teaches how to continuously produce an elastomeric polypropylene (which is partially dissolved and partially suspended in the reaction solvent). Elastomeric polypropylene has only been able to be produced in a batch process (U.S. Pat. No. 4,335,225). It would be very desirable to be able to produce elastomeric polypropylene in a continuous process.

SUMMARY OF INVENTION

The process according to the present invention for the synthesis of elastomeric polypropylene comprises contacting propylene and 0 to 80 weight percent of an unreactive hydrocarbon solvent in the presence of a Group IV organometallic catalyst supported on $Al_2O_3$ at a temperature of about 60° to 80° C. in a recirculated, stirred reactor for a time to produce elastomeric polypropylene, wherein said recirculated, stirred reactor is agitated such that the reactor contents are well mixed while a portion of the contents of said reactor containing propylene, solvent, and elastomeric polypropylene are continually removed by the use of a high viscosity pump to recover said elastomeric polypropylene; wherein said reactor contents are essentially free of catalyst poisons and wherein the elastomeric polypropylene in said reactor is in the combination slurry/solution phase.

DETAILED DESCRIPTION OF THE INVENTION

Figure 1:
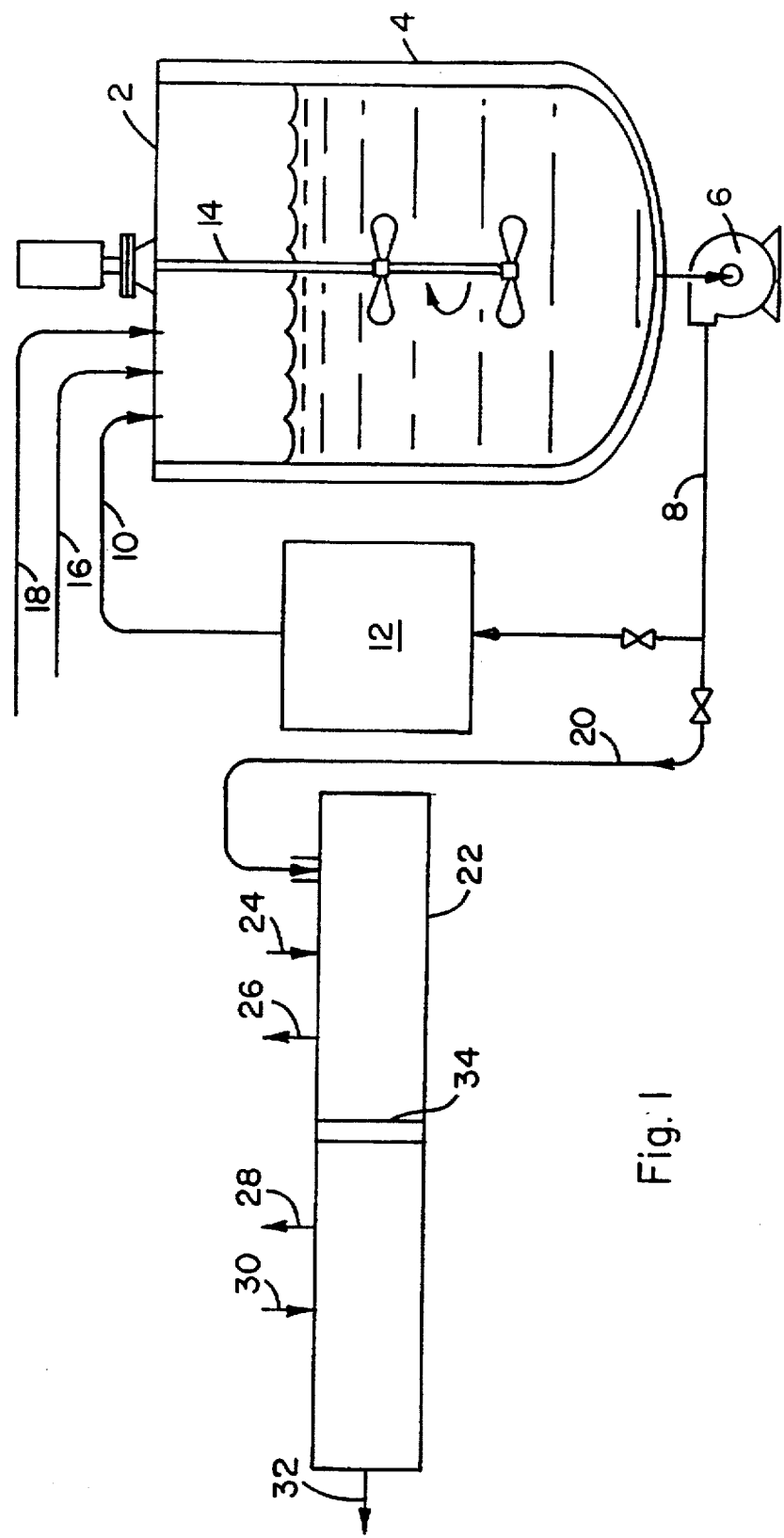
FIG. 1 This drawing illustrates a preferred process of polymerizing the elastomeric polypropylene in a stirred reactor containing a viscous solution. Monomer and catalyst are introduced into the reactor and product is continually removed with a partial recycle to the reactor.

Applicants have unexpectedly discovered a continuous process for the production of elastomeric polypropylene. The applicants have also unexpectedly discovered an improved process for the production of elastomeric polypropylene in a slurry/solution process containing a high amount of solids. The entire process system entails an innovative feed purification systems, innovative catalyst delivery systems, innovative reactor design, innovative down stream processing systems and innovative product isolation systems.

The process according to the present invention for the production of elastomeric polypropylene comprises contacting propylene and 0 to 80 weight percent of an unreactive hydrocarbon solvent in the presence of a Group IV organometallic catalyst supported on $Al_2O_3$ at a temperature of about 60° to 80° C. in a recirculated, stirred reactor for a time to produce elastomeric polypropylene, wherein said recirculated, stirred reactor is agitated such that the reactor contents are well mixed while a portion of the contents of said reactor containing propylene, solvent, and elastomeric polypropylene are continually removed by the use of a high viscosity pump to recover said elastomeric polypropylene; wherein said reactor contents are essentially free of catalyst poisons and wherein the elastomeric polypropylene in said reactor is in the combination slurry/solution phase.

In the process according to the present invention the unreactive hydrocarbon solvent is preferably mineral spirits. The process according to the present invention is preferably conducted in the presence of mineral spirits at a concentration of about 10 to 50 weight percent.

In the process according to the present invention said contacting of propylene is preferably conducted neat in the presence of liquid propylene so that the reaction rate is higher, with an elastomeric polypropylene solids concentration greater than about 10 weight percent, preferably 10 to 50 weight percent, with a weight percent of solids of about 20 to 40 being most preferred.

In the process according the present invention said Group IV organometallic catalyst is preferably a zirconium organometallic catalyst. The catalyst is more preferably a reaction product of a partially dehydrated fumed alumina and a tetra alkyl zirconium compound which possessed no beta hydrogen atom. Examples of suitable zirconium compounds include tetraneophyl zirconium and tetra benzyl zirconium. Similar organometallic compounds made with other Group IV metals such as titanium and hafnium can also be used but the zirconium compounds are preferred with tetraneophyl zirconium supported on $Al_2O_3$ being most preferred.

In the process according to the present invention said Group IV organometallic catalyst is preferably a tetraneophyl zirconium supported on $Al_2O_3$ at a zirconium to aluminum ratio of about 1:4 to 1:12, preferably about 1:6 to 1:10, more preferably about 1:8.

In the process according to the present invention said Group IV organometallic catalyst supported on $Al_2O_3$ is preferably in a concentration of about 0.5 to 0.01, more preferably about 0.1 to 0.2, with about 0.12 to 0.15 being most preferred.

In the process according to said temperature is about 60° to 80° C. At temperatures below about 60° C. chunks of amorphous polypropylene precipitate causing the elastomeric polypropylene particles to stick together whereas at temperatures much above about 80° C. the elastomeric polypropylene particles themselves become sticky. This temperature is preferably about 65° C. to 75° C., with about 70° C. being most preferred.

In the process according to the present invention said catalyst is preferably introduced into said reactor coated with polymer. For example the catalyst can be coated with elastomeric polypropylene prior to introduction into said reactor. More preferably the catalyst is in the form of prepolymer coated catalyst particles. In the process according to the present invention the catalyst is prepolymerized with a monomer selected from the group consisting of 4-methyl-pentene-1, hexene, octene, propylene, ethylene, and mixtures of monomers thereof.

In the process according to the present invention said propylene and any solvent are preferably purified prior to being introduced into said reactor by passing through at least one absorption bed such that the reactor contents are essentially pure, free of said catalyst poisons. By catalyst poisons it is meant anything that deactivates the catalyst requiring the addition of higher amounts of catalysts. The amount of catalyst poisons present in the reactor are preferably at least down to 1 ppm and below.

In the process according to the present invention the elastomeric polypropylene is preferably recovered in a two stage venting and solvent exchange system wherein said venting is preceded with the addition of mineral spirits and exchanged with the liquid propylene that is vented.

In the process according to the present invention the elastomeric polypropylene is preferably in a concentration of about 20 to 50 weight percent solids in said mineral spirits after said recovery and further processed in a screw extruder. In the process according to the present invention the screw extruder is preferably a twin-screw extruder equipped with two vacuum ports isolated from each other.

In the process according to the present invention said contacting is preferably conducted at a pressure of about 250 to 1000 psig.

In the process according to the present invention the contacting for the majority of the contents of said reactor is preferably for a time of about 0.5 to 10 hours more preferably about 3 to 5 hours.

In the process according to the present invention a portion of said contents of said recirculated, stirred reactor is preferably recirculated by being continually pumped out of said reactor at one point and pumped into said reactor at another point, more preferably said contents of said reactor are recirculated such that 10 to 100 percent of the volume of said reactor is recirculated over a period of time of about 5 minutes to 2 hours. Additionally a portion of the contents of said reactor can be continually removed by taking a slip stream off the contents being recirculated. The process according to the present invention a portion of said contents can be recirculated by said high viscosity pump out of the bottom of said reactor into the top of said reactor, such as by a gear pump.

The process according to the present invention said reactor is agitated by the use of a rotating stirrer having a central rotating shaft with paddles attached perpendicular to said shaft.

A preferred process of producing the elastomeric polypropylene of the present invention is illustrated in FIG. 1. The reactor 2 is jacked with a heat exchanging means 4 to maintain the appropriate temperature of polymerization inside the reactor 2. Unreacted propylene monomer and any solvent, such as mineral spirits, enters the reactor via line 18. Catalyst enters the reactor via line 16. The reactor 2 is equipped with agitation means or stirring mean 14 and recirculating means 6 to maintain a thorough mixing of reactants and elastomeric polypropylene product. Elastomeric polypropylene product and unreacted reactants exit the bottom of the stirred reactor 2 and are pumped into line 8 by the use of a high viscosity pump 6, such as a gear pump. The material containing product and unreacted reactants is taken from the reaction system via line 20. A portion of the material is continually recycled to a heat exchanger 12 and back into reactor 2 through line 10. The product and unreacted reactants in line 20 can be stored in a container or tank (not shown) for later recovery of the product.

An optional process of recovering product entails the introduction of wet air and antioxidant to kill and deactivate the catalyst. Reactants and any solvent or diluent are removed by vacuum stripping.

An alternate preferred process for recovering the product and deactivating the catalyst entails introducing antioxidant and acid scavenger into the tank (not shown) and mixing with the material using a circulating pump (not shown). This material is then introduced into a screw extruder 22 and the majority of the volatile materials are removed by vacuum 26, purified, and recycled back to the reactor 2 via line 18. After thorough mixing and back mixing such as in a twin screw extruder with a reverse element between two blisters 34 an additional vacuum is pulled 28. This vacuum removes the remainder of the unreacted monomer and volatile material and the catalyst deactivation products that were generated by the introduction of air and water (both introduced at a point behind the second vacuum port at 24). Other materials can be added at 30. The product then exits the extruder at 32 and generally contains high weight percent solids over 98 weight percent (98.8%).

ELPP's unique combination of relatively high melting point (150° C.) low density, low crystallinity, flexural modulus, hardness and tensile strength) high elongation elastomeric nature make it ideally suited for a variety of applications. These included many applications presently using flexible polyvinyl chloride (PVC), ethylene-vinyl acetate copolymers, low density polyethylene as well as other pure or compounded products and include extruded goods such as gaskets, tapes, tubing, membranes, hoses, wire and cable and seals; injection or blow molded products such as flexible bottles and toys; film and sheet extruded goods and flexible fibers. ELPP can be extrusion coated onto a variety of substrates where the combination of flexibility elasticity and heat resistance is important. It should be noted that ELPP should find additional use as an additive to many existing polyolefins because it is compatible with them and it should improve their properties. For example, if added to modified bitumen it improved its flexibility and elongation;

if added to PP film resins it improved their tear strength; if added to impact copolymers it improved their blush resistance and if added to asphalt it improved its elevated temperature performance. ELPP also should find usefulness as a blend component in adhesives, sealants and caulks. It performs like a polymeric plasticizer for a variety of polymers and polyolefins in particular. ELPP also provides excellent melt strength and should therefore promote melt strength in blends with polyolefins where melt strength is needed such as thermoforming applications.

The following examples are intended to illustrate the present invention but are not intended to limit the reasonable scope thereof.

EXAMPLES

The continuous ELPP process in these examples required that the polymerization grade propylene be circulated for at least 8 hours through an absorption bed train consisting of ALCOA SELEXSORB COS, BASF R3-11 (reduced) and LINDE 13×molecular sieves and that: purified mineral spirits distilled and passed through beds of Davidson SILICA Gel (6×12) and LINDE 5A molecular sieves was circulated for at least 8 hours through an absorption bed train consisting of ALCOA SELEXSORB COS, LINDE 13×molecular sieves, BASF R3-12 and ALCOA SELEXSORB CD before these feeds could enter the reactor. Without these additional treatments of the feeds only very poor catalyst activity was obtained requiring higher amounts of catalyst for the same amount of elastomeric polypropylene.

Normally a catalyst slurry in mineral spirits, was made up in the catalyst tank at a concentration of 4.5 g solid catalyst per 1 liter of mineral spirits. This slurry was then circulated through the catalyst tank to keep the catalyst particles in suspension which insured that a uniform catalyst mixture could be continually fed to the reactor. Unfortunately, the pumps and valves could not withstand the attack of the abrasive $Al_2O_3$, scarring the balls and seats of the control valve, scarring the checks of the LAPP and WHITEY diaphragm pumps and damaging the seal between the O-ring and plunger of JAMESBERRY plunger type pumps. This problem was solved by diluting the catalyst slurry significantly from 4.5 grams catalyst/liter to 1.35 grams catalyst/liter and by adding ELPP slurry to the catalyst slurry or by producing a poly 4-methyl-pentene-1, a polyhexene, a polyoctene, polypropylene, or propylene-ethylene copolymer prepolymer in the catalyst tank. The ELPP and the prepolymer coat the $Al_2O_3$ catalyst particles and thus provide the lubrication needed to nullify the abrasive nature of the $Al_2O_3$, allowing the catalyst delivery system to work trouble free.

An attempt was made to use a loop reactor to produce polymers in the slurry or solution phase. However, this reactor was not useful for the production of ELPP in the combination slurry/solution phase because polymer started building up around the rough spots, and bends of the reactor walls causing poor heat transfer, poor temperature control and finally plugging of the reactor. This problem was solved by a different reactor design. This specific design consists of a stirred autoclave equipped with a spring loaded anchor type stirrer and a recirculation system equipped with an LCI gear pump. This system allowed the continuous production of ELPP at high solids content e.g. 20 percent solids in a mineral spirits or liquid propylene slurry for several weeks with good temperature control and without reactor fouling.

If the polymerization was carried out in liquid propylene down stream processing has been a problem because big polymer chunks were formed in the degassing vessel and lines plugged because during the propylene evaporation process energy is consumed which can freeze the lines and make the temperature control very difficult. At temperatures below much 70° C. dissolved amorphous polypropylene starts precipitating which then coats the semicrystalline ELPP particles and makes them stick together and at temperatures much above 70° C. the ELPP becomes soft and under pressure also makes the particles stick together forming polymer chunks. These problems were solved by a two stage venting and solvent exchange system. In this arrangement the polymer slurry was discharged with addition of mineral spirits into the first let down tank (450–125 psi) and then into a second let down tank (125 psi–20 psi). From here the polymer slurry was transferred to a catalyst deactivation tank where wet $N_2$ was purged through the slurry. Finally the now 20 percent ELPP in mineral spirits slurry was transferred to the twin-screw extruder.

If the polymerization is carried out in mineral spirits one let down tank can be eliminated because less propylene has to be removed. However, somewhat lower polymer to catalyst yields were obtained if mineral spirits is used as a diluent.

The isolation of ELPP from a 15–20 percent solids slurry in mineral spirits in a single pass through a twin-screw extruder (TSE) was also a difficult task. An innovative screw design and two vacuum ports isolated from each other were used to solve this problem. For screw design, TSE set up and extrusion conditions see FIG. 1. More details of this invention can be found in the examples that follow.

The continuously produced product in these examples was elastomeric and exhibits histeresis which means when tensile bars are elongated they recover quickly to a large extent once the stress is released.

Example 1

A catalyst tank was charged with one liter of a catalyst slurry consisting of 12.0 grams partially dehydrated fumed $Al_2O_3$ from DuPont having a hydroxyl count of 0.3 to 0.9 mmoles OH/grams $Al_2O_3$ and 1.5 grams tetraneophyl zirconium (TNZ) (weight ratio of $AL_2O_3/TNZ=8/1$), in 1.0 liter of dry mineral spirits, 7.0 liters of dry mineral spirits and 2.0 liter of 5.0 percent ELPP slurry. The ELPP slurry was prepared by taking a slip steam from the 2nd let down tank and diluting it with dry mineral spirits from ~20 to ~5 percent solids. This catalyst slurry consisting now of 1.5 grams TNZ and 12 grams of $AL_2O_3$ in 10.0 liter of ~1.0 wt% ELPP slurry in mineral spirits was continuously fed to a 10 gallon stirred autoclave reactor at 5 liter/hour (8.26 pounds mineral spirits/hour, 0.0132 pounds $Al_2O_3$/hour, 0.00165 pounds TNZ/hour and 0.083 pounds ELPP/hour. Also fed to the reactor were high purity $C_3H_6$ at 4.13 pounds/hour and high purity $H_2$ at 0.25 SCFH (0.00117 pound/hour) under the following reaction conditions:

Reaction Temp. °C.=65+2
$H_2/C_3H_6$ ratio (wt)=0.00028
Jacket Temp. °C=40
Wt% mineral spirits feed=66.6%
Pressure, psi=450
Wt% propylene feed=33.3%

Under these conditions, a 2.4 flow rate ELPP was produced as a 20.6 percent solids slurry at 10.34 pounds/hour, which calculates to an ELPP production rate of 2.09 pounds/hour and a catalyst yield of 1,261 pounds ELPP/pounds TNZ.

The reactor discharge was degassed in the let down tank reducing the pressure from 450 to 20 psi. A slip stream of this product was transferred to a slurry tank for catalyst preparation, the rest was transferred to a catalyst deactivation vessel where wet $N_2$ was purged through the slurry at a rate of 5.0 SCFH. The catalyst deactivated ELPP slurry was then pumped to a product hold up tank from which the 25 mm twin-screw extruder was fed. The product was isolated by vacuum stripping of the solvent in a 25 mm TSE and stabilized by adding 0.25 percent Irganox 1010 based on solid ELPP into the 25 mm TSE. The pelletized product was analyzed for melt flow rate and DSC melting point. Usually the melt flow rate gave values between 2.0 and 3.0 grams/10 min at 230° C. and the DSC melting points usually ranged between 149° and 151° C.

Example 2

The same experiment as in Example 1 was carried out except that a poly-4-methyl-pentene-1 prepolymer was prepared in the catalyst tank and that the addition of the ELPP slurry was omitted. The catalyst tank was charged with a one liter catalyst slurry consisting of 10.0 grams partially dehydrated fumed $Al_2O_3$ from DuPont, 1.25 grams TNZ and 1 liter of dry mineral spirits, 150 grams (225 ml) of distilled and dried 4-methyl-pentene-1 and 8.775 liter of dry mineral spirits. This catalyst slurry which could contain as much as 150 grams poly-4-methyl-pentene-1 prepolymer was continuously fed to the reactor at 5 liters/hour (8.07 pounds mineral spirits/hour, 0.011 pounds $Al_2O_3$/hour, 0.00138 pounds TNZ/hour and ~0.165 pounds prepolymer/hour). Otherwise the polymerization was carried out as described in Example 1.

Under these conditions 2.2 melt flow rate ELPP having a DSC melting point of 150° C. was produced as a 19.8 percent solids slurry at 10.06 pounds/hours which calculates to an ELPP production of 1.99 pounds/hour and a catalyst yield of 1.442 pounds ELPP/pound TNZ.

Example 2A

The same experiment as in Example 1 was carried out except that a polyoctene prepolymer was prepared in the catalyst tank and that the addition of the ELPP slurry was omitted. The catalyst tank was charged with a one liter catalyst slurry consisting of 10.0 grams partially dehydrated fumed $Al_2O_3$ from DuPont, 1.25 grams TNZ; and 1 liter of dry mineral spirits, 150 grams of distilled and dried octene-1, and 8.775 liter of dry mineral spirits. This catalyst mixture which could contain as much as 150 grams polyoctene-1 was continuously fed to the reactor at 5 liter/hour (0.07 pounds mineral spirits/hour, 0.011 pounds $AL_2O_3$/hour, 8.00138 pounds TNZ/hour and ~0.165 pounds prepolymer/hour). Otherwise the polymerization was carried out as described in Example 1.

Example 3

In this example, the polymerization was carried out in liquid propylene. The catalyst was prepared by reacting the TNZ with partially dehydrated fumed $Al_2O_3$ at room temperature in isopentane. The isopentane used was purified by circulating it for 12 hours through an absorption bed train identical to that used for the mineral spirits purification. Each catalyst batch was prepared as follows: 10 grams of TNZ dissolved in 100 ml of isopentane was added to a slurry of 80 grams partially dehydrated fumed $Al_2O_3$ in 2.000 ml isopentane.

This mixture was stirred for 2 hours at room temperature, filtered and dried in vacuum. This procedure was carried out in a $N_2$ filled dry box. The catalyst was charged to the reactor semi-continuously by charging catalyst charge bombs with 1.8 grams of the catalyst (1.6 grams $A_2O_3$+0.2 grams TNZ) and pressuring the catalyst with high purity $N_2$ into the reactor every 20 minutes. Also fed to the reactor was high purity $C_3H_6$ at 12 pounds/hour and high purity $H_2$ at 0.75 SCFH (0.00351 pounds/hour) under the following reaction conditions:

Reaction Temp. °C.=65±2
Jacket Temp.=35–40
Pressure psi=450
$H_2/C_3H_6$ Ratio (wt)=0.00029

The reactor was discharged continuously into two let down tanks where the pressure was gradually decreased from 450 to 20 psi and the propylene was replaced with mineral spirits. Mineral spirits was added at a rate to assure that the wt% solids in the final ELPP/mineral spirits slurry were maintained between 18 and 23 percent. On an average 15 pounds of a 20 percent solids ELPP slurry was discharged from the catalyst deactivation tank per hour which calculates to an ELPP production of 3.0 pounds/hour and a yield of 2,273 pounds ELPP/pounds TNZ. The melt flow rate of the extruded ELPP ranged from 1.9 to 2.2 and the DSC meeting point ranged from 149° to 151° C.

We claim:

1. A process for the production of elastomeric polypropylene comprising contacting propylene and 0 to 80 weight percent of an unreactive hydrocarbon solvent in the presence of a Group IV organometallic catalyst supported on $Al_2O_3$ at a temperature of about 60° to 80° C. in a recirculated, stirred reactor for a time to produce elastomeric polypropylene, said recirculated, stirred reactor is agitated such that the and continually removing a portion of the contents of said reactor containing propylene, solvent, and elastomeric polypropylene by the use of a high viscosity pump recovering said elastomeric polypropylene; wherein said recirculated, stirred reactor is agitated such that the reactor contents are well mixed, wherein said reactor contents are essentially free of catalyst poisons and wherein the elastomeric polypropylene in said reactor is in the combination slurry/solution phase.

2. The process according to claim 1 wherein said contacting of propylene is conducted in the presence of mineral spirits at a concentration of about 10 to 50 weight percent.

3. The process according to claim 1 wherein said contacting of propylene is conducted neat in the presence of liquid propylene with an elastomeric polypropylene solids concentration greater than about 10 weight percent.

4. The process according to claim 3 further comprising recovering said elastomeric polypropylene in a two stage venting and solvent exchange system comprising adding mineral spirits to exchange with the liquid propylene and venting the liquid propylene.

5. The process according to claim 4 wherein said elastomeric polypropylene is in a concentration of about 20 to 50 weight percent solids in said mineral spirits after said recovery and further processed in a screw extruder.

6. The process according to claim 5 wherein said screw extruder is a twin-screw extruder equipped with two vacuum ports isolated from each other.

7. The process according to claim 1 wherein said Group IV organometallic catalyst is tetraneophyl zirconium supported on $Al_2O_3$ at a tetraneophyl zirconium to $Al_2O_3$ weight ratio of about 1:4 to 1:12.

8. The process according to claim 7 wherein said tetraneophyl zirconium catalyst supported on $Al_2O_3$ is in a weight ratio concentration of about 0.12 to 0.15 per pound of $Al_2O_3$.

9. The process according to claim 1 wherein said temperature is about 65° C. to 75° C.

10. The process according to claim 1 wherein said contacting for the majority of the contents of said reactor is for a time of about 0.5 to 10 hours.

11. The process according to claim 1 wherein a portion of said contents of said recirculated, stirred reactor is recirculated by being continually pumped out of said reactor at one point and pumped into said reactor at another point and wherein a portion of the contents of said reactor are continually removed by taking a slip stream off the contents being recirculated.

12. The process according to claim 11 wherein said contents of said reactor are recirculated such that 10 to 100 percent of the volume of said reactor is recirculated over a period of time of about 5 minutes to 2 hours.

13. The process according to claim 12 wherein said portion of said contents is recirculated by said high viscosity pump out of the bottom of said reactor into the top of said reactor.

14. The process according to claim 1 wherein said reactor is agitated by the use of a rotating stirrer having a central rotating shaft with paddles attached perpendicular to said shaft and wherein said high viscosity pump is a gear pump.

15. The process according to claim 1 wherein said catalyst is introduced into said reactor coated with polymer.

16. The process according to claim 15 wherein said catalyst has been coated with elastomeric polypropylene prior to introduction into said reactor.

17. The process according to claim 15 wherein said catalyst is in the form of prepolymer coated catalyst particles prepolymerized with a monomer selected from the group consisting of 4-methyl-pentene-1, hexene, octene, propylene, ethylene, and mixtures of monomers thereof.

18. The process according to claim 1 wherein said propylene and any solvent are purified prior to being introduced into said reactor by passing through at least one absorption bed.

19. The process according to claim 18 wherein said reactor contents are essentially pure, free of said catalyst poisons at least down to 1 ppm.

20. The process according to claim 1 wherein said contacting is conducted at a pressure of about 250 to 1000 psig.

* * * * *

UNITED STATES PATENT AND TRADEMARK OFFICE
CERTIFICATE OF CORRECTION

PATENT NO. : 5,744,555
DATED : April 28, 1998
INVENTOR(S) : William A. Ames et al.

It is certified that error appears in the above-identified patent and that said Letters Patent is hereby corrected as shown below:

Column 8, lines 30 and 31 (Claim 1, lines 6 and 7), "said recirculated, stirred reactor is agitated such that the" should be deleted.

Signed and Sealed this

Twenty-fifth Day of August, 1998

Attest:

BRUCE LEHMAN

Attesting Officer

Commissioner of Patents and Trademarks